H. G. CADY.
SUBMARINE VESSEL.
APPLICATION FILED MAY 23, 1911.
1,072,569.
Patented Sept. 9, 1913.
2 SHEETS—SHEET 2.
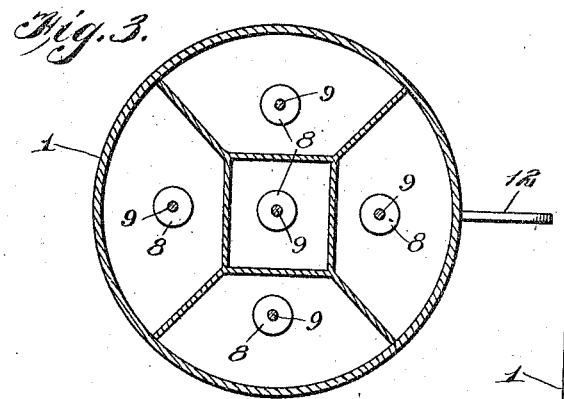
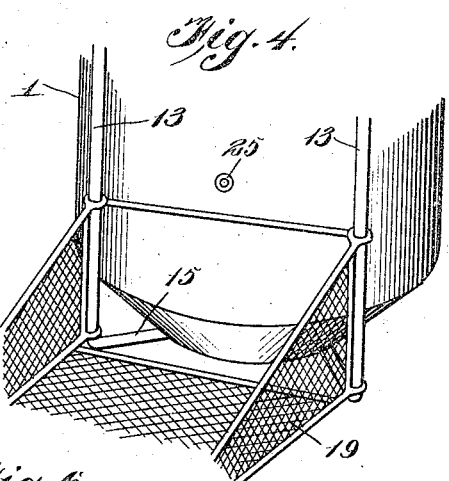
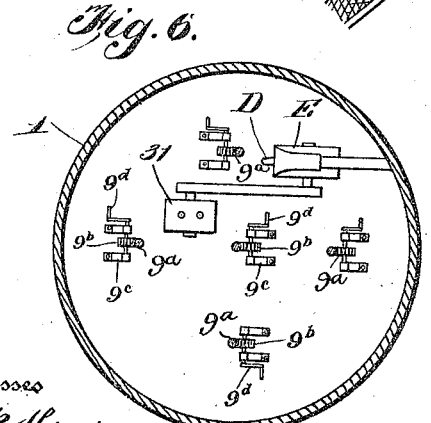
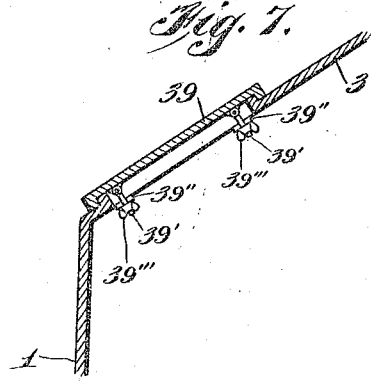
Witnesses
Louis R. Heinrichs
Inventor
Henry G. Cady
By Victor J. Evans
Attorney

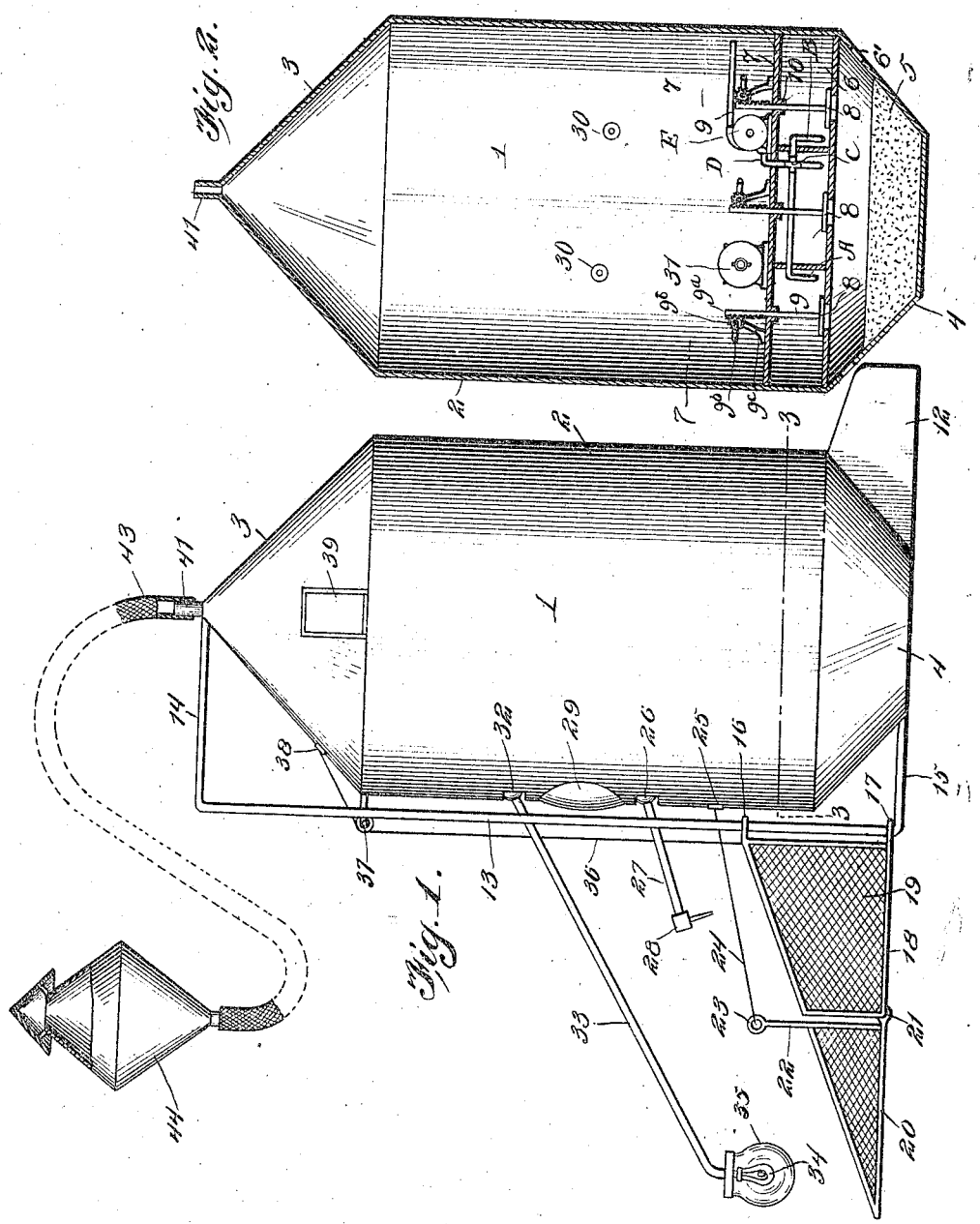

UNITED STATES PATENT OFFICE.

HENRY G. CADY, OF ST. LOUIS, MISSOURI.

SUBMARINE VESSEL.

1,072,569.   Specification of Letters Patent.   Patented Sept. 9, 1913.

Application filed May 23, 1911. Serial No. 628,970.

*To all whom it may concern:*

Be it known that I, HENRY G. CADY, a citizen of the United States, residing at St. Louis, in the State of Missouri, have invented new and useful Improvements in Submarine Vessels, of which the following is a specification.

The present invention relates to sub-marine vessels.

In carrying out my invention it is my purpose to provide a sub-marine vessel of a peculiar construction which may be easily propelled upon the surface of the water, or below the surface; and further to provide the vessel with means arranged upon the exterior, but operated from its interior whereby valuables may be recovered from the bottom of the water, and elevated to the top of the vessel so that the same may be readily removed when the vessel is permitted to rise to the surface of the water.

With the above, and other objects in view, the invention resides in the construction, combination, and operative arrangement of parts set forth in the following description, and falling within the scope of the appended claims.

In the drawings, Figure 1 is a side elevation of a vessel constructed in accordance with the present invention. Fig. 2 is a central vertical longitudinal sectional view of the same. Fig. 3 is a horizontal sectional view taken approximately on the line 3—3 of Fig. 1. Fig. 4 is a detail perspective view of the lower portion of the vessel. Fig. 5 is a detail sectional view taken through the universal water tight joint through which the rake member is extended. Fig. 6 is a horizontal sectional view on the line 7—7 of Fig. 2. Fig. 7 is a detail sectional view illustrating the manner of securing the entrance door upon the vessel.

In the drawings, the numeral 1 designates the vessel. The vessel embodies a cylindrical body 2 having a cone-shaped top 3, and a frusto-conical bottom 4. The bottom is provided with a ballast 5, of some heavy material, such as lead, and which is adapted to sustain the cylindrical body in a vertical position when the vessel is raised to the surface of the water, or when submerged below the surface of the water. The ballast 5 is not, however, of sufficient weight to submerge the vessel, and in order to accomplish this I have provided the vessel with a water receiving compartment 6, the lower wall of which being spaced a suitable distance away from the upper portion of the ballast, and the vessel, between the ballast and the chamber, is formed with a plurality of water inlet openings 6'. The chamber 6, in the showing of the drawings, is divided into a plurality of compartments, each being provided with a water inlet opening which is normally closed through the medium of, what may be termed, plug valves 8, each being provided with an upwardly extending stem 9 which passes through suitable openings in the upper floor 7 of the compartments, and also through suitable packing boxes 10 provided upon the said floor. Each of these stems is preferably formed with a toothed face $9^a$, with which co-acts a toothed wheel $9^b$, that is mounted upon a suitable support $9^c$. Each of the wheels is provided with an operating handle $9^d$, whereby any of the said valves may be raised to permit of the entrance of water to any, or to all, of the compartments. Each of the compartments is provided with an outlet pipe A. The pipes A are preferably connected through the medium of a cross or X coupling C which is arranged in the central compartment, and the said coupling is connected with a pipe D which is attached to a force pump E. This pump may be operated in any desired manner but preferably is connected with a dynamo 31 which is also provided for separate purposes, which will presently be described. The pump E is, of course, employed for ejecting water from any or all of the compartments, as described. In quite a number of instances it is desirable in the recovery of valuables from the bed of water, to tilt or incline the vessel, as well as to sustain the same at the desired angle with relation to the bank or surface containing the valuables. So, it will be noted that the provisions of the compartments is an essential feature of the present invention.

The vessel is provided with a rudder 12, which is actuated by mechanism arranged within the body of the vessel, the said mechanism being of any desired construction is not illustrated. The vessel, opposite its rudder 12, has arranged thereon vertically extending rods 13, the ends of which being offset and connected with the top and bottom of the vessel, as indicated by the numerals 14 and 15.

Arranged upon the rods 13 are slidable members 16 and 17, which are connected to the substantially V-shaped sides of a reticulated basket or elevator. The basket comprises a pair of members 19 and 20. The member 20 is hingedly connected to the bottom of the member 19, as at 21, and the member 20 is provided with an extension 22 that has its extremity formed with an eye 23. Secured to the eye is a flexible member 24 which enters the body 2 of the vessel through a water pipe joint 25. The flexible element provides means whereby the basket section 20 may be swung upon its hinge toward the section 19, to deposit the material gathered within the said section 20 to within the section 19.

The vessel is, of course, provided with suitable propelling mechanism which may be of any desired construction and which has not therefore been illustrated.

The body 2 of the vessel is provided with water tight socket joints 26 which provide bearings for the handles 27 of rake members 28. These rakes are manipulated by the occupants of the vessel, and are adapted to gather articles from the bed of the water and deposit the same within the basket 18. When a desired quantity of material has been deposited upon the section 20 of the basket, the same through the manipulation of the flexible element 24 is swung rearwardly upon its hinge so that the contents thereof are deposited within the section 19. The section 20, when in such position, serves as a closure for the section 19.

The numeral 29 designates a powerful magnifying glass which is mounted in water tight bearings, and which is arranged directly above the rakes 28, so that the occupants of the vessel may observe the surroundings. The vessel is also provided with a plurality of electric bulbs 30, the current for which being supplied by the dynamo 31. The numeral 32 designates a water tight ball or socket joint through which extends a tube 33. This tube is adapted to carry the wiring of an incandescent lamp 34, the latter being inclosed in a water tight globe 35 which is constructed of magnifying glass. The wires for the lamp 34 are also connected with the dynamo 31.

The cone-shaped top 30 is provided with a door 39, the same having flanged edges which coöperate with a flange or way 40 that surrounds the outlet opening of the vessel. Suitable packings are arranged between the flanges to render the doorway water tight; and the door is sustained in a proper closed position upon the vessel preferably through the medium of pivoted bolts 39′ which pass through openings in transversely arranged members 39″ the latter being disposed across the companionway or opening; and the said bolts are engaged by suitable thumb nuts 39‴.

The apex of the cone-shaped top 3 of the vessel is provided with a spout 41 to which is connected a flexible tube 43. This tube communicates with a buoy 44 which is adapted to float upon the surface of the water. The buoy comprises a hollow body and the tube 43 is of sufficient length to permit of the vessel being submerged to any depth without drawing the buoy below the surface of the water. The buoy is adapted to serve as a means wherein fresh air is continually admitted to the interior of the vessel. It is, of course, to be understood that a foul air outlet (which includes a flexible tube and a floating buoy) may also be employed, if desired, and furthermore that a blast fan (which may derive power from the dynamo 31) may be arranged to coöperate with the air inlet tube, and also that a suction fan may coöperate with the foul air inlet pipe.

It is desirable to elevate the basket 18 to the top of the vessel in order that the contents thereof may be removed and in order to accomplish this a cable 36 is connected with the basket, and the said cable is trained over a suitable pulley 37 arranged adjacent the top of the vessel, and enters the vessel through a water tight joint 38.

Having thus described the invention, what I claim is:—

1. A sub-marine vessel comprising a cylindrical body having a cone-shaped top, and a frusto-conical bottom, the bottom being provided with a ballast, a chamber arranged above the ballast and spaced therefrom, the frusto-conical bottom of the vessel being provided with openings between the ballast and chamber, the said chamber having its bottom provided with openings, plug valves for each of the openings, a stem for each of the valves and projecting through the chamber, means arranged within the chamber and co-acting with the stems for operating the plug valves, a flexible tube connected with the cone-shaped top, a hollow buoy connected with the tube and adapted to ride upon the surface of the water, and a normally closed outlet opening arranged upon the top of the vessel.

2. A sub-marine vessel comprising a cylindrical body having a cone-shaped top and a frusto-conical bottom, a ballast for the bottom, and a chamber arranged above the ballast, the frusto-conical bottom being provided with water inlet openings between the chamber and the ballast, the said chamber being divided into a plurality of compartments, each having its lower wall provided with an opening, plug valves for each of the openings, stems for each of the valves and projecting within the vessel, each of the stems being provided with a toothed face, a pivoted toothed wheel co-acting with each of the toothed portions of the stems, an operating handle for each of the toothed wheels, and an air inlet for the vessel.

3. A sub-marine vessel comprising a cylindrical body having a cone-shaped top and a frusto-conical bottom, a ballast for the bottom, a chamber for the bottom above the ballast, the bottom being provided with openings between the ballast and the chamber, the said chamber having its lower wall provided with openings, valves for normally closing the openings, means for operating the valves, a force pump communicating with the chamber, means for operating the pump, a reticulated basket slidably connected with the vessel and raking instruments operatable from the interior of the vessel and arranged adjacent the basket.

4. A sub-marine vessel comprising a cylindrical body having its lower portion provided with a water chamber, valves for regulating the admission of water to the chamber, means for operating the valves to permit of an inflow of water to the chamber to submerge the vessel, means for permitting the entrance of air to the vessel, means for ejecting the water from the chamber, to permit of the raising of the vessel, vertical rods positioned adjacent one of the sides of the vessel and connected with the vessel at the top and bottom thereof, a vertically movable reticulated basket slidably mounted upon the rods, means for raising the basket upon the rods, said basket comprising a pair of hinged sections, means arranged upon the outer section and communicating with the interior of the vessel for swinging the outer section of the basket upon the inner section of the basket, and a flexible element connected with the basket and entering the vessel at the top thereof, substantially as and for the purpose set forth.

5. In a diving vessel, for the purpose set forth, means for permitting an inlet of water to lower the vessel below the surface of the water, means for ejecting the water to render the vessel bouyant and to permit its rising to the surface of the water, an air inlet for the vessel, a basket connected with the vessel, means for raising the basket from the bottom to the top of the vessel, and raking members operative from the interior of the vessel, and disposed above the basket when the said basket is in its lowered position, all substantially as and for the purposes set forth.

In testimony whereof I affix my signature in presence of two witnesses.

HENRY G. CADY.

Witnesses:
J. H. SEYMOUR,
HENRY A. WHITE.